United States Patent
Angus

(10) Patent No.: US 11,977,168 B2
(45) Date of Patent: May 7, 2024

(54) LIDAR SYSTEM

(71) Applicant: AURORA OPERATIONS, INC., Mountain View, CA (US)

(72) Inventor: Edward Joseph Angus, Bozeman, MT (US)

(73) Assignee: AURORA OPERATIONS, INC., Mountain View, CA (US)

( * ) Notice: Subject to any disclaimer, the term of this patent is extended or adjusted under 35 U.S.C. 154(b) by 187 days.

(21) Appl. No.: 17/509,986

(22) Filed: Oct. 25, 2021

(65) Prior Publication Data

US 2022/0043159 A1 Feb. 10, 2022

Related U.S. Application Data

(63) Continuation of application No. 17/167,862, filed on Feb. 4, 2021, now Pat. No. 11,181,642, which is a
(Continued)

(51) Int. Cl.
*G01S 17/931* (2020.01)
*G01S 7/481* (2006.01)
(Continued)

(52) U.S. Cl.
CPC .......... *G01S 17/931* (2020.01); *G01S 7/4813* (2013.01); *G01S 7/4814* (2013.01); *G01S 7/4816* (2013.01); *G05D 1/0088* (2013.01); *G05D 1/021* (2013.01)

(58) Field of Classification Search
CPC .... G01S 17/931; G01S 7/4813; G01S 7/4814; G01S 7/4816; G01S 17/34; G01S 7/4817;
(Continued)

(56) References Cited

U.S. PATENT DOCUMENTS 5,917,640 A 6/1999 Staver
5,946,125 A 8/1999 Ang
(Continued)

FOREIGN PATENT DOCUMENTS

JP 2017-097199 A 6/2017
WO WO-2012/117542 A1 9/2012
(Continued)

OTHER PUBLICATIONS

International Search Report and Written Opinion on PCT Appl. Ser. No. PCT/US2021/038089 dated Jul. 21, 2021 (6 pages).
(Continued)

*Primary Examiner* — Thomas Ingram

(74) *Attorney, Agent, or Firm* — FOLEY & LARDNER LLP

(57) ABSTRACT

A LIDAR system includes a laser source configured to output a first beam and a polygon scanner. The polygon scanner includes a plurality of facets. Each facet of the plurality of facets is configured to transmit a second beam responsive to the first beam. The plurality of facets include a first facet having a first field of view over which the first facet transmits the second beam and a second facet having a second field of view over which the second facet transmits the second beam. The first field of view is greater than the second field of view.

20 Claims, 12 Drawing Sheets

Related U.S. Application Data continuation of application No. 16/906,378, filed on Jun. 19, 2020, now Pat. No. 10,942,277.

(51) Int. Cl.
  *G05D 1/00* (2006.01)
  *G05D 1/02* (2020.01)

(58) Field of Classification Search
  CPC ...... G01S 17/26; G05D 1/0088; G05D 1/021; G02B 1/10; G02B 27/10; G02B 27/30
  See application file for complete search history.

(56) References Cited

U.S. PATENT DOCUMENTS

| | | | |
|---|---|---|---|
| 2013/0175343 A1 | 7/2013 | Good | |
| 2017/0299697 A1 | 10/2017 | Swanson | |
| 2018/0188355 A1 | 7/2018 | Bao et al. | |
| 2018/0275252 A1 | 9/2018 | Fried et al. | |
| 2018/0284279 A1* | 10/2018 | Campbell | G01S 7/4816 |
| 2019/0154816 A1* | 5/2019 | Hughes | G01S 7/497 |
| 2019/0310468 A1 | 10/2019 | Sapir | |
| 2019/0310469 A1 | 10/2019 | Sapir | |
| 2020/0049819 A1* | 2/2020 | Cho | G02B 26/123 |
| 2020/0088848 A1 | 3/2020 | Kremer et al. | |
| 2020/0166647 A1 | 5/2020 | Crouch et al. | |
| 2020/0217936 A1* | 7/2020 | Galloway | G01S 7/4814 |
| 2020/0278425 A1 | 9/2020 | Angus et al. | |

FOREIGN PATENT DOCUMENTS

| | | |
|---|---|---|
| WO | WO-2018/011945 A1 | 1/2018 |
| WO | WO-2018/107237 A1 | 6/2018 |
| WO | WO-2019/133101 A1 | 7/2019 |

OTHER PUBLICATIONS

Non-Final Office Action on U.S. Appl. No. 16/906,378 dated Sep. 4, 2020 (5 pages).
Non-Final Office Action on U.S. Appl. No. 17/167,862 dated Apr. 1, 2021 (13 pages).
Notice of Allowance on U.S. Appl. No. 16/906,378 dated Nov. 5, 2020 (8 pages).
Notice of Allowance on U.S. Appl. No. 17/167,862 dated Jul. 28, 2021 (9 pages).
Canadian Office Action issued in connection with CA Appl. Ser. No. 3179657 dated Dec. 16, 2022 (4 pages).
Japanese Office Action issued in connection with JP Appl. Ser. No. 2022-570662 dated Apr. 25, 2023.
Extended European Search Report issued in connection with EP Appl. No. 21825648.5 dated Aug. 8, 2023.

* cited by examiner

LIDAR SYSTEM

CROSS-REFERENCE TO RELATED APPLICATIONS

The present application is a continuation of U.S. patent application Ser. No. 17/167,862, filed Feb. 4, 2021, which is a continuation of U.S. patent application Ser. No. 16/906,378, filed Jun. 19, 2020, now U.S. Pat. No. 10,942,277, issued on Mar. 9, 2021. The entire disclosures of U.S. patent application Ser. No. 16/906,378 and U.S. patent application Ser. No. 17/167,862 are hereby incorporated by reference as if fully set forth herein.

BACKGROUND

Optical detection of range using lasers, often referenced by a mnemonic, LIDAR, for light detection and ranging, also sometimes called laser RADAR, is used for a variety of applications, including imaging and collision avoidance. LIDAR provides finer scale range resolution with smaller beam sizes than conventional microwave ranging systems, such as radio-wave detection and ranging (RADAR).

SUMMARY

At least one aspect relates to a light detection and ranging (LIDAR) system. The LIDAR system includes a laser source configured to output a first beam and a polygon scanner. The polygon scanner includes a plurality of facets. Each facet of the plurality of facets is configured to transmit a second beam responsive to the first beam. The plurality of facets include a first facet having a first field of view over which the first facet transmits the second beam and a second facet having a second field of view over which the second facet transmits the second beam. The first field of view is greater than the second field of view.

At least one aspect relates to an autonomous vehicle control system. The autonomous vehicle control system includes a polygon scanner and one or more processors. The polygon scanner includes a plurality of facets. Each facet of the plurality of facets is configured to transmit a transmit beam responsive to an input beam. The plurality of facets include a first facet having a first field of view over which the first facet transmits the transmit beam and a second facet having a second field of view over which the second facet transmits the transmit beam. The first field of view is greater than the second field of view. The one or more processors are configured to determine at least one of a range to or a velocity of an object using a return beam received responsive to the transmit beam, and control operation of an autonomous vehicle responsive to the at least one of the range or the velocity.

At least one aspect relates to an autonomous vehicle. The autonomous vehicle includes a LIDAR system, at least one of a steering system or a braking system, and a vehicle controller. The LIDAR system includes a laser source configured to output a first beam and a polygon scanner. The polygon scanner includes a plurality of facets. Each facet of the plurality of facets is configured to transmit a second beam responsive to the first beam. The plurality of facets include a first facet having a first field of view over which the first facet transmits the second beam and a second facet having a second field of view over which the second facet transmits the second beam. The first field of view is greater than the second field of view. The a vehicle controller comprising one or more processors configured to determine at least one of a range to or a velocity of the object using a return beam from an object responsive to the second beam, and control operation of the at least one of the steering system or the braking system responsive to the at least one of the range or the velocity.

Those skilled in the art will appreciate that the summary is illustrative only and is not intended to be in any way limiting. Any of the features described herein may be used with any other features, and any subset of such features can be used in combination according to various embodiments. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Implementations are illustrated by way of example, and not by way of limitation, in the figures of the accompanying drawings in which like reference numerals refer to similar elements and in which.

DETAILED DESCRIPTION

A LIDAR system can generate and transmit a light beam that an object can reflect or otherwise scatter as a return beam corresponding to the transmitted beam. The LIDAR system can receive the return beam, and process the return beam or characteristics thereof to determine parameters regarding the object such as range and velocity. The LIDAR system can apply various frequency or phase modulations to the transmitted beam, which can facilitate relating the return beam to the transmitted beam in order to determine the parameters regarding the object.

The LIDAR system can include a polygon scanner that outputs the transmitted beam, such as by reflecting the transmitted beam at various azimuth and elevation angles. As such, the LIDAR system can operate as a sensor by using the polygon scanner to scan an environment around the LIDAR system to detect parameters of objects in the environment. The polygon scanner can include multiple facets that have reflective surfaces to reflect and output the transmitted beam. A field of view of the facets (and in turn the polygon scanner) can correspond to an angular extent of the facets. For example, for a regular polygon scanner (e.g., a polygon scanner having equal angles between adjacent facets and equal lengths of facets) having four facets, each facet can have an angular extent of 90 degrees (based on an angle measured from edges of the facet to a center of the polygon scanner), and the field of view of the facet can be 280 degrees (e.g., two times the angular extent, based on an amount that the reflective facet can steer an incoming beam of light).

Systems and methods in accordance with the present disclosure can include a polygon scanner that has at least some facets that have different lengths and angles relative to adjacent facets, such that the fields of view of the facets can vary. For example, the polygon scanner can be shaped as an irregular polygon, rather than a regular polygon. A LIDAR system that uses such a polygon scanner can have increased sampling density (e.g., resolution) over certain angular ranges, such as over a central portion of an azimuthal field of view of the polygon scanner where the fields of view of the facets overlap. This can improve performance characteristics of the LIDAR system, such as signal to noise ratio, for determining parameters of objects in the environment around the LIDAR system using the transmitted beam and return beams that are scattered by the objects in the environment. For example, improved performance characteristics can enable the LIDAR system to more accurately determine range, velocity, and Doppler shift information regarding objects, which can enable a maximum design range of the LIDAR system to increase. For example, the LIDAR system can be effectively used for long range applications (e.g., maximum range greater than 400 meters), such as autonomous trucking.

1. System Environments for Autonomous Vehicles

Figure 1A:
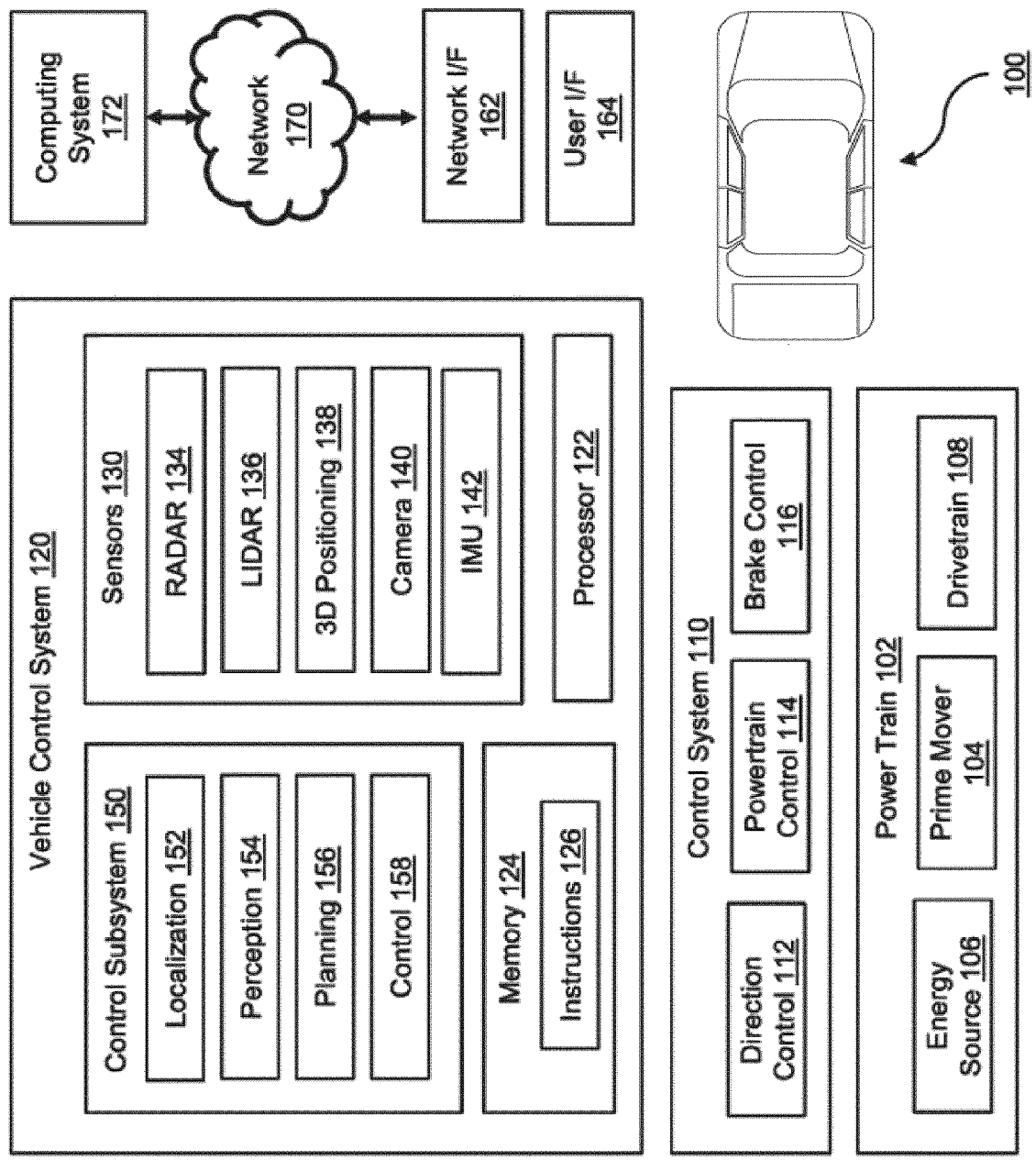
FIG. 1A is a block diagram of an example of a system environment for autonomous vehicles.

FIG. 1A is a block diagram illustrating an example of a system environment for autonomous vehicles according to some implementations. FIG. 1A depicts an example autonomous vehicle 100 within which the various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling in various environments. The aforementioned components 102-116 can vary widely based upon the type of vehicle within which these components are utilized, such as a wheeled land vehicle such as a car, van, truck, or bus. The prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 108 can include wheels and/or tires along with a transmission and/or any other mechanical drive components to convert the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, may utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers.

Various levels of autonomous control over the vehicle 100 can be implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)")) and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, LIDAR (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100. Each sensor 130 can output sensor data at various data rates, which may be different than the data rates of other sensors 130.

The outputs of sensors 130 may be provided to a set of control subsystems 150, including a localization subsystem 152, a planning subsystem 156, a perception subsystem 154, and a control subsystem 158. The localization subsystem 152 can perform functions such as precisely determining the location and orientation (also sometimes referred to as "pose") of the vehicle 100 within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 100. A machine learning model in accordance with some implementations can be utilized in tracking objects. The planning subsystem 156 can perform functions such as planning a trajectory for vehicle 100 over some timeframe given a desired destination as well as the static and moving objects within the environment. A machine learning model in accordance with some implementations can be utilized in planning a vehicle trajectory. The control subsystem 158 can perform functions such as generating suitable control signals for controlling the various controls in the vehicle control system 120 in order to implement the planned trajectory of the vehicle 100. A machine learning model can be utilized to generate one or more signals to control an autonomous vehicle to implement the planned trajectory.

Multiple sensors of types illustrated in FIG. 1A can be used for redundancy and/or to cover different regions around a vehicle, and other types of sensors may be used. Various types and/or combinations of control subsystems may be used. Some or all of the functionality of a subsystem 152-158 may be implemented with program code instructions 126 resident in one or more memories 124 and executed by one or more processors 122, and these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

Various architectures, including various combinations of software, hardware, circuit logic, sensors, and networks, may be used to implement the various components illustrated in FIG. 1A. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors illustrated in FIG. 1A, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 100 receives environmental and other data for use in autonomous control thereof. Data collected by the one or more sensors 130 can be uploaded to a computing system 172 via the network 170 for additional processing. In some implementations, a time stamp can be added to each instance of vehicle data prior to uploading.

Each processor illustrated in FIG. 1A, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. Any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), the present disclosure is not limited to the specific organization and allocation of program functionality described herein.

2. LIDAR for Automotive Applications

A truck can include a LIDAR system (e.g., vehicle control system 120 in FIG. 1A, LIDAR system 200 in FIG. 2A, among others described herein). In some implementations, the LIDAR system can use frequency modulation to encode an optical signal and scatter the encoded optical signal into free-space using optics. By detecting the frequency differences between the encoded optical signal and a returned signal reflected back from an object, the frequency modulated (FM) LIDAR system can determine the location of the object and/or precisely measure the velocity of the object using the Doppler effect. In some implementations, an FM LIDAR system may use a continuous wave (referred to as, "FMCW LIDAR") or a quasi-continuous wave (referred to as, "FMQW LIDAR"). In some implementations, the LIDAR system can use phase modulation (PM) to encode an optical signal and scatters the encoded optical signal into free-space using optics.

In some instances, an object (e.g., a pedestrian wearing dark clothing) may have a low reflectivity, in that it only reflects back to the sensors (e.g., sensors 130 in FIG. 1A) of the FM or PM LIDAR system a low amount (e.g., 10% or less) of the light that hit the object. In other instances, an object (e.g., a shiny road sign) may have a high reflectivity (e.g., above 10%), in that it reflects back to the sensors of the FM LIDAR system a high amount of the light that hit the object.

Regardless of the object's reflectivity, an FM LIDAR system may be able to detect (e.g., classify, recognize, discover, etc.) the object at greater distances (e.g., 2x) than a conventional LIDAR system. For example, an FM LIDAR system may detect a low reflectively object beyond 300 meters, and a high reflectivity object beyond 400 meters.

To achieve such improvements in detection capability, the FM LIDAR system may use sensors (e.g., sensors 130 in FIG. 1A). In some implementations, these sensors can be single photon sensitive, meaning that they can detect the smallest amount of light possible. While an FM LIDAR system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM LIDAR system in infrared wavelengths, the FM or PM LIDAR system can broadcast stronger light pulses or light beams while meeting eye safety standards. Conventional LIDAR systems are often not single photon sensitive and/or only operate in near infrared wavelengths, requiring them to limit their light output (and distance detection capability) for eye safety reasons.

Thus, by detecting an object at greater distances, an FM LIDAR system may have more time to react to unexpected obstacles. Indeed, even a few milliseconds of extra time could improve safety and comfort, especially with heavy vehicles (e.g., commercial trucking vehicles) that are driving at highway speeds.

The FM LIDAR system can provide accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW LIDAR systems, the signal can be converted to the RF domain such that the frequency shift can be calculated using various signal processing techniques. This enables the autonomous vehicle control system to process incoming data faster.

Instantaneous velocity calculation also makes it easier for the FM LIDAR system to determine distant or sparse data points as objects and/or track how those objects are moving over time. For example, an FM LIDAR sensor (e.g., sensors 130 in FIG. 1A) may only receive a few returns (e.g., hits) on an object that is 300 m away, but if those return give a velocity value of interest (e.g., moving towards the vehicle at >70 mph), then the FM LIDAR system and/or the autonomous vehicle control system may determine respective weights to probabilities associated with the objects.

Faster identification and/or tracking of the FM LIDAR system gives an autonomous vehicle control system more time to maneuver a vehicle. A better understanding of how fast objects are moving also allows the autonomous vehicle control system to plan a better reaction.

The FM LIDAR system can have less static compared to conventional LIDAR systems. That is, the conventional LIDAR systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional LIDAR systems often need extra hardware, complex software, and/or more computational power to manage this "noise."

In contrast, FM LIDAR systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM LIDAR systems produce (e.g., generates, derives, etc.) more accurate data with less hardware or software requirements, enabling safer and smoother driving.

The FM LIDAR system can be easier to scale than conventional LIDAR systems. As more self-driving vehicles (e.g., cars, commercial trucks, etc.) show up on the road, those powered by an FM LIDAR system likely will not have to contend with interference issues from sensor crosstalk. Furthermore, an FM LIDAR system uses less optical peak power than conventional LIDAR sensors. As such, some or all of the optical components for an FM LIDAR can be produced on a single chip, which produces its own benefits, as discussed herein.

2.1 Commercial Trucking

Figure 1B:
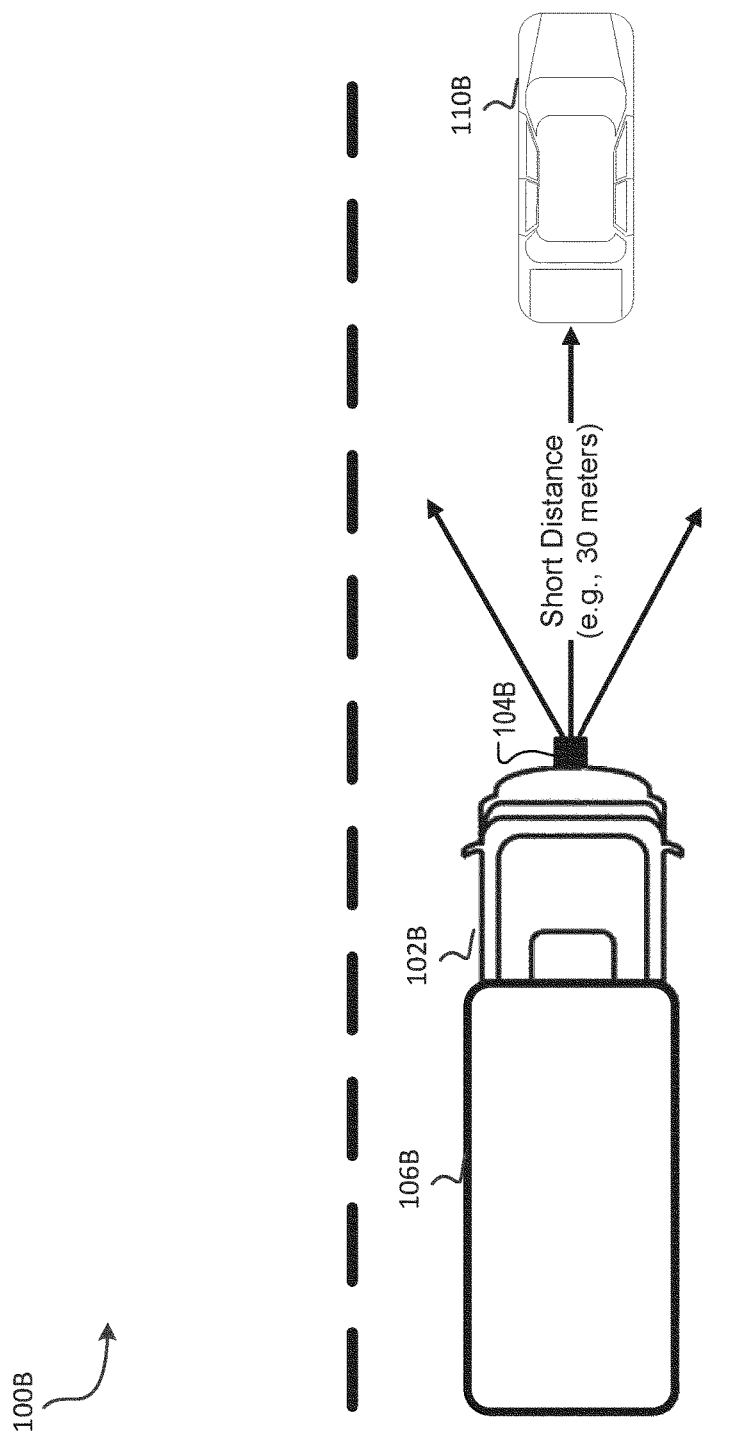
FIG. 1B is a block diagram of an example of a system environment for autonomous commercial trucking vehicles.

FIG. 1B is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. In some implementations, the commercial truck 102B may be a flatbed truck, a refrigerated truck (e.g., a reefer truck), a vented van (e.g., dry van), a moving truck, etc. In some implementations, the cargo 106B may be goods and/or produce. In some implementations, the commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 1B as another vehicle) that is within a distance range that is equal to or less than 30 meters from the truck.

The commercial truck 102B may include a LIDAR system 104B (e.g., an FM LIDAR system, vehicle control system 120 in FIG. 1A, LIDAR system 200 in FIG. 2A) for determining a distance to the object 110B and/or measuring the velocity of the object 110B. Although FIG. 1B shows that one LIDAR system 104B is mounted on the front of the commercial truck 102B, the number of LIDAR system and the mounting area of the LIAR system on the commercial truck are not limited to a particular number or a particular area. The commercial truck 102B may include any number of LIDAR systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the LIDAR system 104B in environment 100B may be configured to detect an object (e.g., another vehicle, a bicycle, a tree, street signs, potholes, etc.) at short distances (e.g., 30 meters or less) from the commercial truck 102B.

Figure 1C:
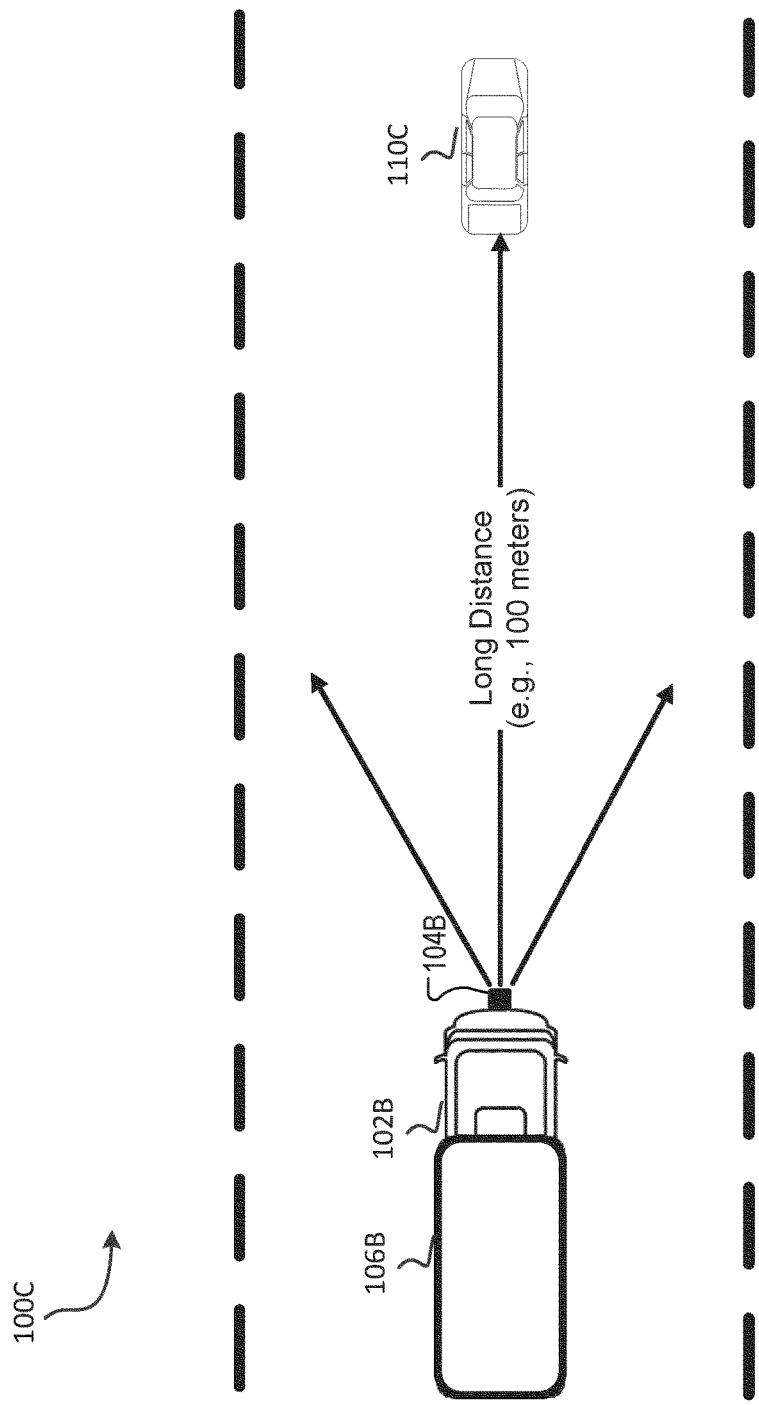
FIG. 1C is a block diagram of an example of a system environment for autonomous commercial trucking vehicles.

FIG. 1C is a block diagram illustrating an example of a system environment for autonomous commercial trucking vehicles, according to some implementations. The environment 100C includes the same components (e.g., commercial truck 102B, cargo 106B, LIDAR system 104B, etc.) that are included in environment 100B.

The environment 100C includes an object 110C (shown in FIG. 1C as another vehicle) that is within a distance range that is (i) more than 30 meters and (ii) equal to or less than 150 meters from the commercial truck 102B. As shown, the LIDAR system 104B in environment 100C may be configured to detect an object (e.g., another vehicle, a bicycle, a tree, street signs, potholes, etc.) at a distance (e.g., 100 meters) from the commercial truck 102B.

Figure 1D:
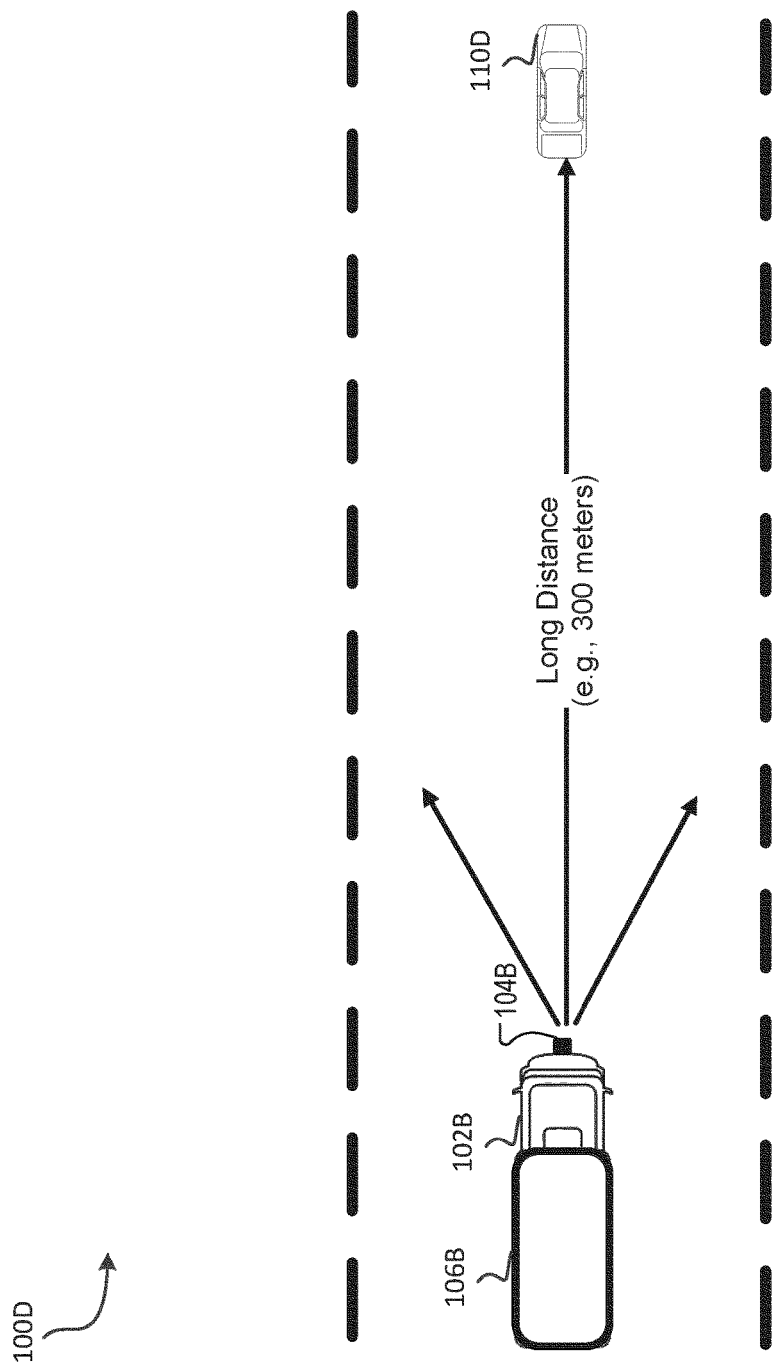
FIG. 1D is a block diagram of an example of a system environment for autonomous commercial trucking vehicles.

FIG. 1D is a block diagram illustrating an example of a system environment for autonomous commercial trucking vehicles, according to some implementations. The environment 100D includes the same components (e.g., commercial truck 102B, cargo 106B, LIDAR system 104B, etc.) that are included in environment 100B.

The environment 100D includes an object 110D (shown in FIG. 1D as another vehicle) that is within a distance range that is more than 150 meters from the commercial truck 102B. As shown, the LIDAR system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM LIDAR systems (e.g., FMCW and/or FMQW systems) or PM LIDAR systems are well-suited for commercial trucking applications due to the advantages described above. As a result, commercial trucks equipped with such systems may have an enhanced ability to safely move both people and goods across short or long distances, improving the safety of not only the commercial truck but of the surrounding vehicles as well. In various implementations, such FM or PM LIDAR systems can be used in semi-autonomous applications, in which the commercial truck has a driver and some functions of the commercial truck are autonomously operated using the FM or PM LIDAR system, or fully autonomous applications, in which the commercial truck is operated entirely by the FM or LIDAR system, alone or in combination with other vehicle systems.

3. LIDAR Systems

Figure 2:
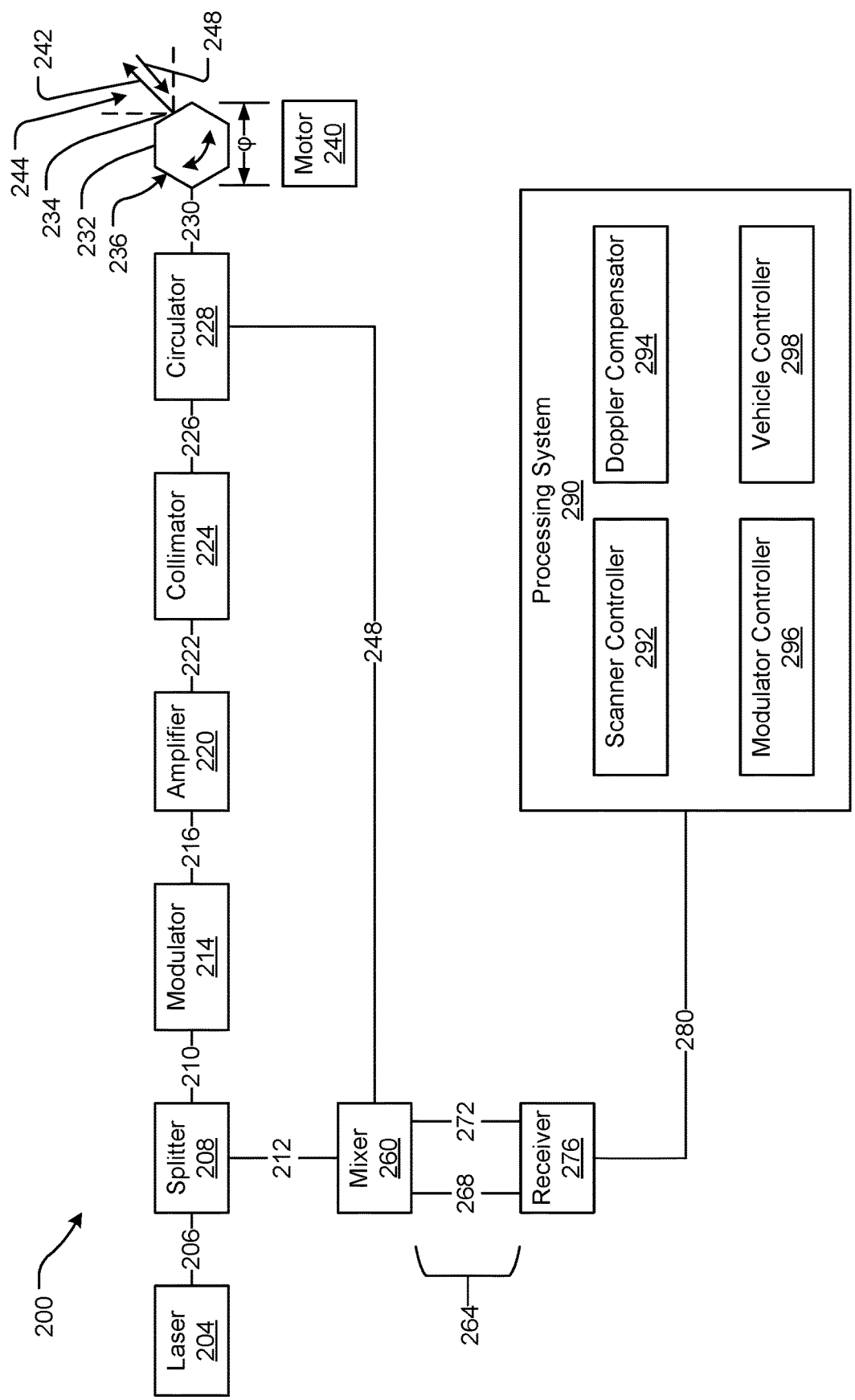
FIG. 2 is a block diagram of an example of a LIDAR system.

FIG. 2 depicts an example of a LIDAR system 200. The LIDAR system 200 can be used to determine parameters regarding objects, such as range and velocity, and output the parameters to a remote system. For example, the LIDAR system 200 can output the parameters for use by a vehicle controller that can control operation of a vehicle responsive to the received parameters (e.g., vehicle controller 298) or a display that can present a representation of the parameters. The LIDAR system 200 can be a coherent detection system. The LIDAR system 200 can be used to implement various features and components of the systems described with reference to FIGS. 1A-1D.

The LIDAR system 200 can include a laser source 204 that emits a beam 206, such as a carrier wave light beam. A splitter 208 can split the beam 206 into a beam 210 and a reference beam 212 (e.g., reference signal).

A modulator 214 can modulate one or more properties of the input beam 210 to generate a beam 216 (e.g., target beam). In some implementations, the modulator 214 can modulate a frequency of the input beam 210. For example, the modulator 214 can modulate a frequency of the input beam 210 linearly such that a frequency of the beam 216 increases or decreases linearly over time. As another example, the modulator 214 can modulate a frequency of the input beam 210 non-linearly (e.g., exponentially). In some implementations, the modulator 214 can modulate a phase of the input beam 210 to generate the beam 216. However, the modulation techniques are not limited to the frequency modulation and the phase modulation. Any suitable modulation techniques can be used to modulate one or more properties of a beam. Returning to FIG. 2, the modulator 214 can modulate the beam 210 subsequent to splitting of the beam 206 by the splitter 208, such that the reference beam 212 is unmodulated, or the modulator 214 can modulate the beam 206 and provide a modulated beam to the splitter 208 for the splitter 208 to split into a target beam and a reference beam.

The beam 216, which is used for outputting a transmitted signal, can have most of the energy of the beam 206 outputted by the laser source 204, while the reference beam 212 can have significantly less energy, yet sufficient energy to enable mixing with a return beam 248 (e.g., returned light) scattered from an object. The reference beam 212 can be used as a local oscillator (LO) signal. The reference beam 212 passes through a reference path and can be provided to a mixer 260. An amplifier 220 can amplify the beam 216 to output a beam 222, which a collimator 224 can collimate to output a beam 226.

As depicted in FIG. 2, a circulator 228 can be between the collimator 224 and a polygon scanner 232 to receive the beam 226 and output a beam 230 to the polygon scanner 232. The circulator 228 can be between the laser source 204 and the collimator 224. The circulator 228 can receive return beam 248 from the polygon scanner 232 and provide the return beam 248 to the mixer 260.

The polygon scanner 232 can include a body 234 and facets 236 defined on exterior surfaces of the body 234. The polygon scanner 232 can be made from aluminum, such as 7000 series aluminum or 8000 series aluminum, which can have high structural stability over a range of expected temperatures of operation of a vehicle, such as an autonomous vehicle. Making the polygon scanner 232 from aluminum can allow the facets 236 to be machined to be very flat.

The polygon scanner 232 can be made from a polymeric material, such as polystyrene, polycarbonate, or polymethylmethacrylate (PMMA) materials. The polymeric material can be selected based on factors such as coefficient of thermal expansion and tolerances for the shape of the polygon scanner 232 (e.g., based on a mold that can be used to form the polygon scanner 232). For example, the polygon scanner 232 can be made from a polymeric material that has a relatively low coefficient of thermal expansion over the range of expected temperatures of operation of the vehicle, to enable the polygon scanner 232 to maintain its shape during operation. The polymeric material can be made flat through diamond turning.

The facets 236 can be reflective. The facets 236 can be formed by polishing the body 234, providing a coating on the body 234, or polishing a coating provided on the body 234. For example, the facets 236 can be made from protected gold, silver, or aluminum (e.g., mechanical polishing of aluminum). The coating can be made by vapor deposition. The coating can be greater than or equal to 200 nanometers (nm) and less than or equal to 400 nm.

The facets 236 can be connected with one another and extend around an axis of rotation of the polygon scanner 232 (e.g., an axis perpendicular to the plane depicted in FIG. 2). The LIDAR system 200 can include a motor 240 that is coupled with the polygon scanner 232 to rotate the polygon scanner 232 about the axis of rotation.

The polygon scanner 232 can define a diameter (e.g., maximum diameter) $\varphi$, such that a radial size $\varphi/2$ of the polygon scanner 232 extends from a center of the polygon scanner 232 (e.g., a center of mass, which may coincide with the axis of rotation based on how the motor 240 is coupled with the polygon scanner 232) to a point along the facets 236 at a maximum distance from the axis of rotation, such as a corner between adjacent facets 236 that is farthest from the center. The diameter $\varphi$ can be greater than or equal to 50 millimeters (mm) and less than or equal to 250 mm.

A maximum design range of the LIDAR system 200 can depend on the diameter $\varphi$ (as well as other characteristics of the polygon scanner 232, such as the sampling density that can be achieved by varying the facets 236 as described further herein). Increasing the diameter $\varphi$ can increase a maximum design range of the polygon scanner 232, while also increasing the mass (and volume) of the polygon scanner 232. As the diameter $\varphi$ of the polygon scanner 232 varies, a size of transmitted beam 242 can vary, including as the transmitted beam 242 moves away from the polygon scanner 232 and increases or diverges in size. The size of the transmitted beam 242 can be a radial size of the transmitted beam 242 in a plane perpendicular to a direction of the transmitted beam 242. A larger diameter $\varphi$ can result in a larger beam, which will increase in size relatively less than a smaller beam (e.g., remain tighter) as the transmitted beam 242 moves away from the polygon scanner 232, which can result in a strong signal for the return beam that is received responsive to the transmitted beam 242. For example, where the diameter $\varphi$ is 50 mm, the maximum design range can be about 250 meters; where the diameter $\varphi$ is 250 mm, the maximum design range can be about 400 meters or greater. The maximum design range can correspond to a maximum distance at which a signal to noise ratio is greater than a threshold signal to noise ratio. The threshold signal to noise ratio can be 5 decibels (dB). The threshold signal to noise ratio can be 10 dB. The signal to noise ratio can correspond to determining range, velocity, or Doppler shift data regarding the object using the return beam 248 and the reference beam 212.

The facets 236 can receive the beam 230 and reflect the beam 230 as a transmitted beam 242. The polygon scanner 232 can define a field of view 244 that corresponds to angles swept by the transmitted beam 242 as the polygon scanner 232 rotates and the facets 236 of the polygon scanner 232 reflect the beam 230 to transmit the transmitted beam 242. For example, as an orientation of a particular facet 236 changes relative to a direction of the beam 230 incident on the particular facet 236, an angle (e.g., azimuth angle) of the transmitted beam 242 will change, enabling the polygon scanner 232 to scan over the field of view 244. The polygon scanner 232 can be oriented so that the field of view 244 sweeps an azimuthal plane relative to the polygon scanner 232. The facets 236 can be oriented at different angles (e.g., elevation angles) relative to the axis of rotation to output the beam 230 at various elevation angles (or the polygon scanner 232 can be oriented so that elevation angles are achieved based on the orientation of the particular facet 236 relative to the direction of the beam 230 and azimuth angles are achieved based on the orientation of the particular facet relative to the axis of rotation).

The field of view 244 can correspond with a number of facets 236 of the polygon scanner 232. For example, the field of view 244 can correspond with the reflection performed by the facet 236 causing the beam 230 to be steered by two times the angle by which the beam 230 is incident on the facet 236. The facets of polygon scanners, including the facets 236, can define a field of view that is two times an angle of the facet 236 (for regular polygon scanners, 820 degrees/N, where N is the number of sides). Polygon scanners that include equilateral (and equiangular) facets can have a field of view that is equal across all facets. For example, a three-sided (e.g., triangular) polygon scanner can have a field of view of 240 degrees, a four-sided (e.g., square) polygon scanner can have a field of view of 180 degrees, a five-sided (e.g., pentagonal) polygon scanner can have a field of view of 144 degrees, and a six-sided (e.g., hexagonal) polygon scanner can have a field of view of 120 degrees.

The polygon scanner 232 can be configured to have a sampling density (e.g., resolution) that varies over the field of view 244. For example, the sampling density can be configured based on the relative lengths and angles between the facets 236. For example, as described herein with respect to various polygon scanners, such as the polygon scanners 300, 400, 500, 600, 700, and 800, at least two first facets 236 of the facets 236 can have lesser lengths than at least two second facets 236 of the facets 236. The first facets 236 can have first fields of view that are less than second fields of view of the second facets 236, causing the transmitted beam 242 to be swept more densely over the first fields of view than the second fields of view. The number of facets 236 of the polygon scanner 232 can be greater than or equal to 6 and less than or equal to 12; increasing the number of facets 236 can allow for greater scan lines while also increasing the volume and mass of the polygon scanner 232.

The transmitted beam 242 can be outputted from the polygon scanner 232 and reflected or otherwise scattered by an object (not shown) as a return beam 248 (e.g., return signal). The return beam 248 can be received on a reception path, which can include the circulator 228, and provided to the mixer 260.

The mixer 260 can be an optical hybrid, such as a 90 degree optical hybrid. The mixer 260 can receive the reference beam 212 and the return beam 248, and mix the reference beam 212 and the return beam 248 to output a signal 264 responsive to the reference beam 212 and the return beam 248. The signal 264 can include an in-phase (I) component 268 and a quadrature (Q) component 272.

The LIDAR system 200 can include a receiver 276 that receives the signal 264 from the mixer 260. The receiver 276 can generate a signal 280 responsive to the signal 264, which can be an electronic (e.g., radio frequency) signal. The receiver 276 can include one or more photodetectors that output the signal 280 responsive to the signal 264.

The LIDAR system 200 can include a processing system 290, which can be implemented using features of the vehicle control system 120 described with reference to FIG. 1A. The processing system 290 can process data received regarding the return beam 248, such as the signal 280, to determine parameters regarding the object such as range and velocity. The processing system 290 can include a scanner controller 292 that can provide scanning signals to control operation of the polygon scanner 232, such as to control a rate of rotation of the polygon scanner 232 by controlling the motor 240. The processing system 290 can include a Doppler compensator 294 that can determine the sign and size of a Doppler shift associated with processing the return beam 248 and a corrected range based thereon along with any other corrections. The processing system 290 can include a modulator controller 296 that can send one or more electrical signals to drive the modulator 214.

The processing system 290 can include or be communicatively coupled with a vehicle controller 298 to control operation of a vehicle for which the LIDAR system 200 is installed (e.g., to provide complete or semi-autonomous control of the vehicle). For example, the vehicle controller 298 can be implemented by at least one of the LIDAR system 200 or control circuitry of the vehicle. The vehicle controller 298 can control operation of the vehicle responsive to at least one of a range to the object or a velocity of the object determined by the processing system 298. For example, the vehicle controller 298 can transmit a control signal to at least one of a steering system or a braking system of the vehicle to control at least one of speed or direction of the vehicle.

Figure 3:
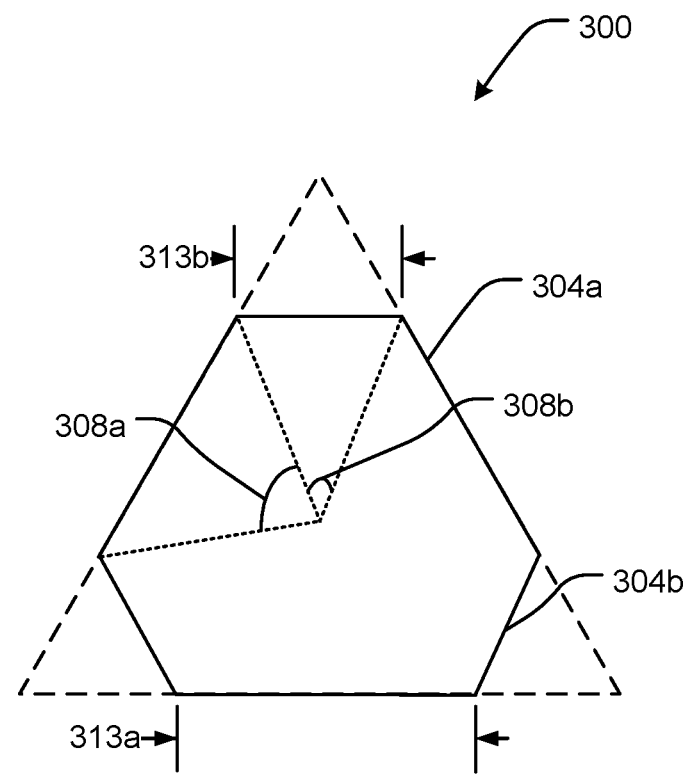
FIG. 3 is a top view of an example of a convex polygon scanner.
Figure 3:
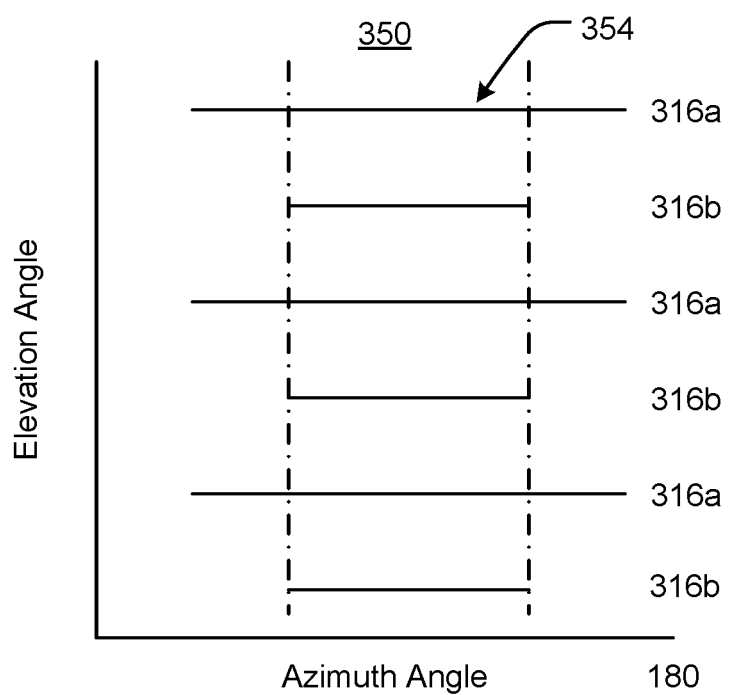

FIG. 3 depicts an example of a polygon scanner 300 and a chart 350 of scan lines (e.g., of transmitted beam 242) achieved using the polygon scanner 300. The polygon scanner 300 can incorporate features of and be used to implement the polygon scanner 232 described with reference to FIG. 2. The polygon scanner 300 can be convex. The polygon scanner 300 includes facets 304 including first facets 304a and second facets 304b. As depicted in FIG. 3, the first facets 304a and second facets 304b are arranged in an alternating order of three first facets 304a and three second facets 304b around the polygon scanner 300. The polygon scanner 304 can be analogous to a triangular polygon scanner (see dashed outline) in which corners are not present, resulting in the second facets 304b. The polygon scanner 300 can be made as a solid body, such as through casting, milling, or molding, or as an assembly of subcomponents (which can individually be casted, milled, or molded) that are stacked and bonded together.

The first facet 304a defines a first angle 308a and a first length 312a, and the second facet 304b defines a second angle 308b and a second length 312b. The angles 308a, 308b can be defined from a center 302 of the polygon scanner 300 to edges (e.g., intersections with adjacent facets 304) of the respective facets 304. The lengths 312a, 312b can be defined along the surfaces of the facets 304 between the edges. The first angle 308a is greater than the second angle 308b, and the first length 312a is greater than the second length 312b. For example, the first angle 308a can be 90 degrees, and the second angle 308b can be 30 degrees. As such, the first facet 304a can define a first field of view 316a (e.g., 180 degrees) that is greater than a second field of view 316b (e.g., 60 degrees) defined by the second facet 304b.

As shown in chart 350, the first facets 304a define relatively larger first fields of view 316a along a greater extent of azimuth angles relative to the second fields of view 316b defined by the second facets 304b. The fields of view can have an overlap portion 354 (demarcated by dot-dashed lines), which can be a central portion of the azimuthal fields of view sampled using both first and second facets 304 relative to outward portions sampled by the first facets 304a and not the second facets 304b. Greater sampling density as a function of azimuth angle can be achieved by the overlap of the scan lines from the relatively longer first facets 304a and the relative shorter second facets 304b. As such, the polygon scanner 300 can be used to selectively capture data with greater signal to noise ratio for particular portions of an overall field of view of the polygon scanner 300, such as portions that can be used to improve operation of an autonomous vehicle.

Figure 4:
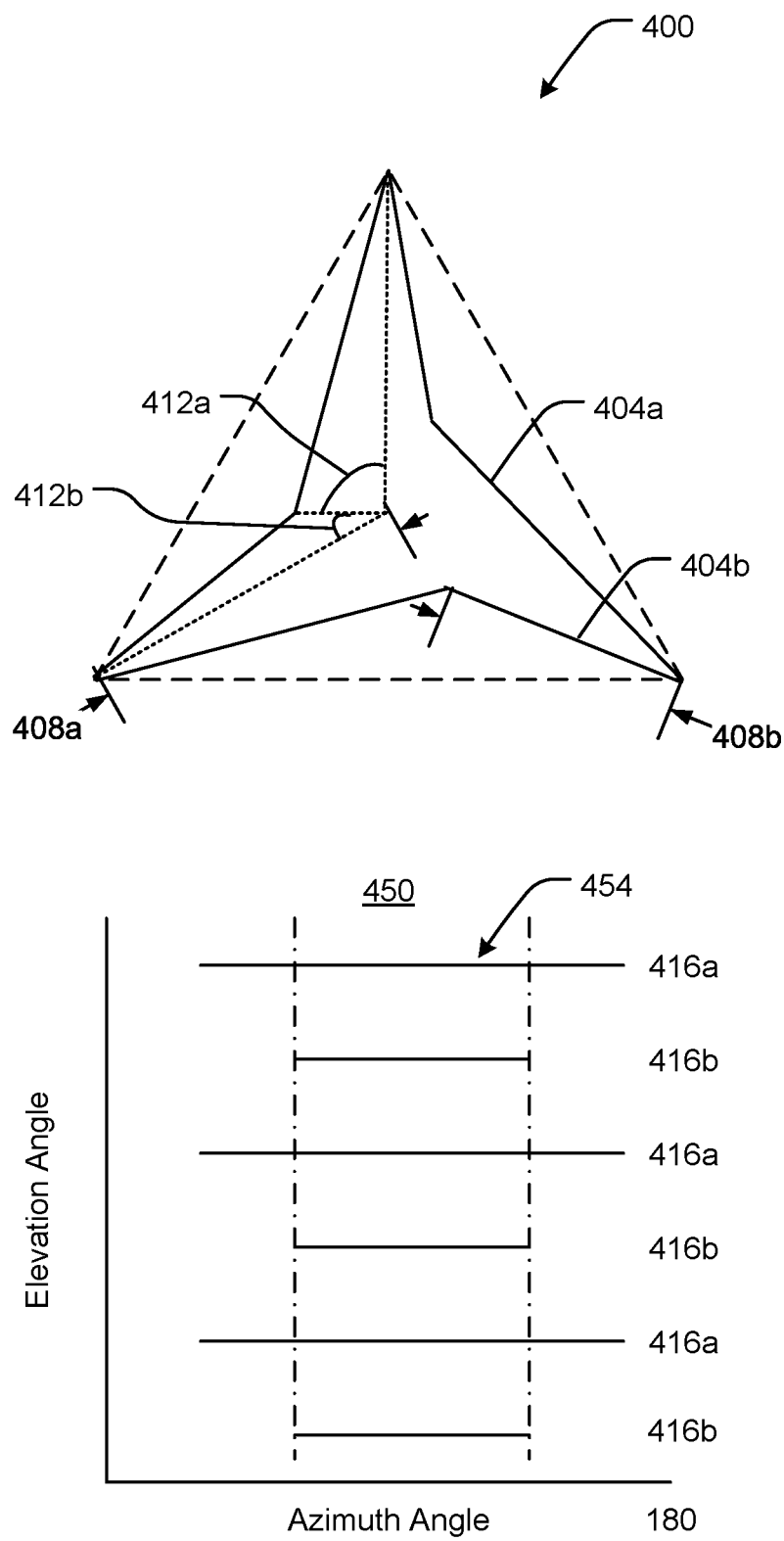
FIG. 4 is a top view of an example of a concave polygon scanner.

FIG. 4 depicts an example of a polygon scanner 400 and a chart 450 of scan lines (e.g., of transmitted beam 242) achieved using the polygon scanner 400. The polygon scanner 400 can be similar to the polygon scanner 300 (e.g., analogous to a triangular polygon scanner) and can have a concave form factor (e.g., include a plurality of concave portions). The polygon scanner 400 can include facets 404 including first facets 404a (e.g., three first facets 404a) defining a first length 408a, a first angle 412a, and a first field of view 416a, and second facets 404b (e.g., three second facets 404b) defining a second length 408b less than the first length 408a, a second angle 412b less than the first angle 412a, and a second field of view 416b less than the first field of view 416a. For example, the first angles 412a can be 90 degrees, the second angles 412a can be 30 degrees, the first fields of view 416a can be 180 degrees, and the second fields of view 416b can be 60 degrees, providing a 60 degree overlap portion 454.

Figure 5:
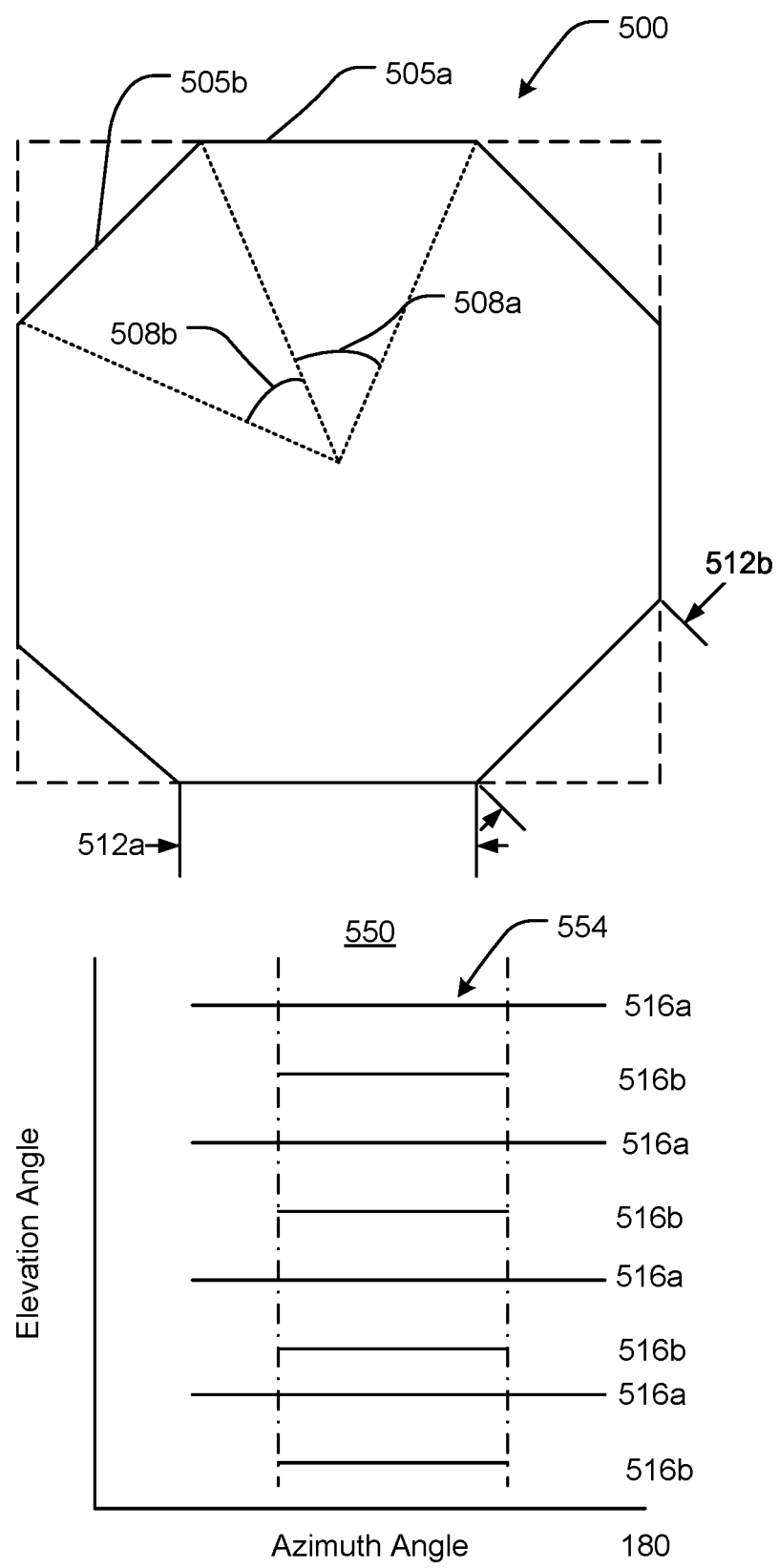
FIG. 5 is a top view of an example of a convex polygon scanner.

FIG. 5 depicts an example of a polygon scanner 500 and a chart 550 of scan lines (e.g., of transmitted beam 242) achieved using the polygon scanner 500. The polygon scanner 500 can incorporate features of the polygon scanners 232, 300, 400, and be used to implement the polygon scanner 232. The polygon scanner 500 can be convex. The polygon scanner 500 includes facets 504 including first facets 504a (e.g., four first facets 504a) and second facets 504b (e.g., four second facets 504b). The polygon scanner 500 can be analogous to a square polygon scanner (see dashed outline) in which corners are not present, resulting in the second facets 504b.

The first facet 504a defines a first angle 508a, a first length 512a, and a first field of view 516a, and the second facet 504b defines a second angle 508b less than the first angle 508a, a second length 512b less than the first length 512a, and a second field of view 516b less than the first field of view 516a. For example, the first angle 508a can be 60 degrees, the first field of view 516a can be 120 degrees, the second angle 508b can be 30 degrees, and the second field of view 516b can be 60 degrees, providing a 60 degree overlap portion 554.

Figure 6:
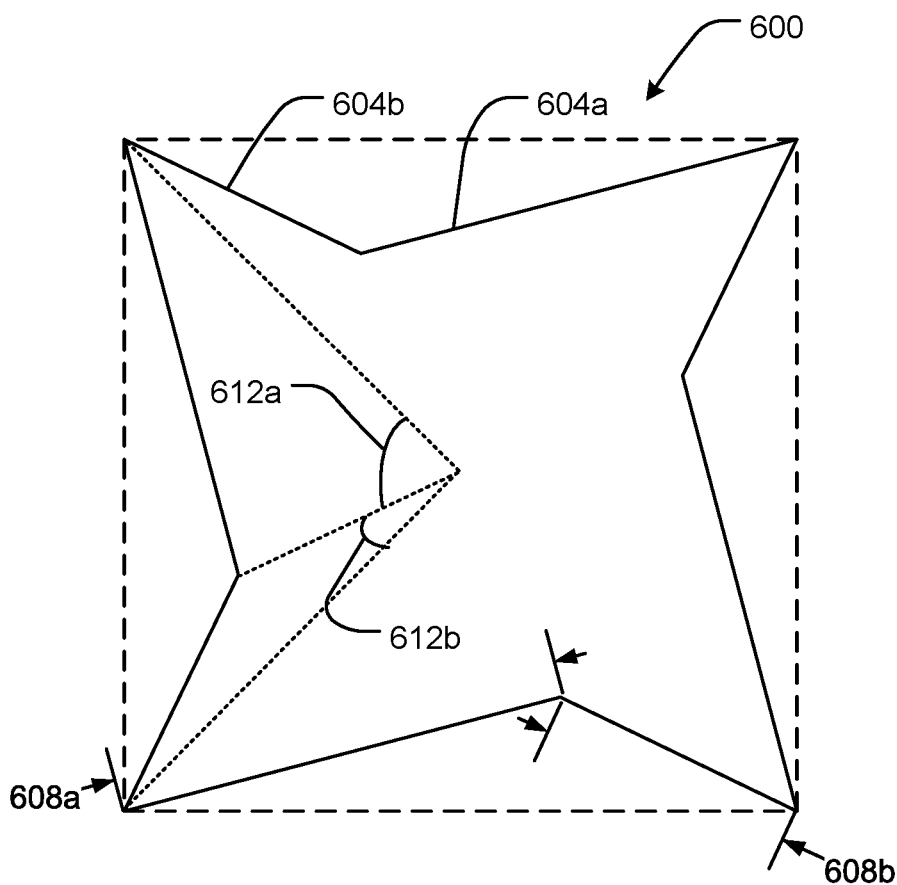
FIG. 6 is a top view of an example of a concave polygon scanner.
Figure 6:
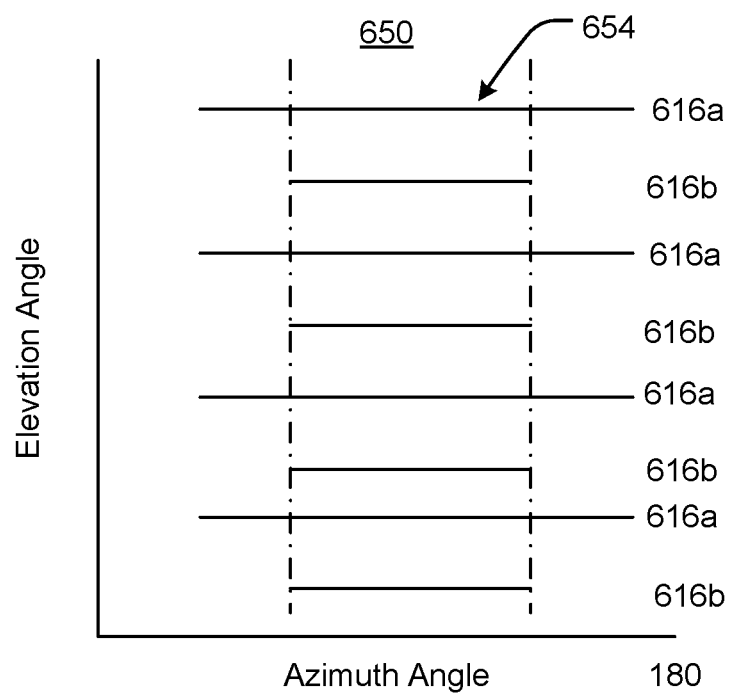

FIG. 6 depicts an example of a polygon scanner 600 and a chart 650 of scan lines (e.g., of transmitted beam 242) achieved using the polygon scanner 600. The polygon scanner 600 can be similar to the polygon scanner 500 (e.g., analogous to a square polygon scanner) and can have a concave form factor. The polygon scanner 600 can include facets 604 including first facets 604a (e.g., four first facets 604a) defining a first length 608a, a first angle 612a, and a first field of view 616a, and second facets 604b (e.g., four second facets 604b) defining a second length 608b less than the first length 608a, a second angle 612b less than the first angle 612a, and a second field of view 616b less than the first field of view 616a. For example, the first angles 612a can be 60 degrees, the second angles 612a can be 30 degrees, the first fields of view 616a can be 120 degrees, and the second fields of view 616b can be 60 degrees, providing a 60 degree overlap portion 654.

Figure 7:
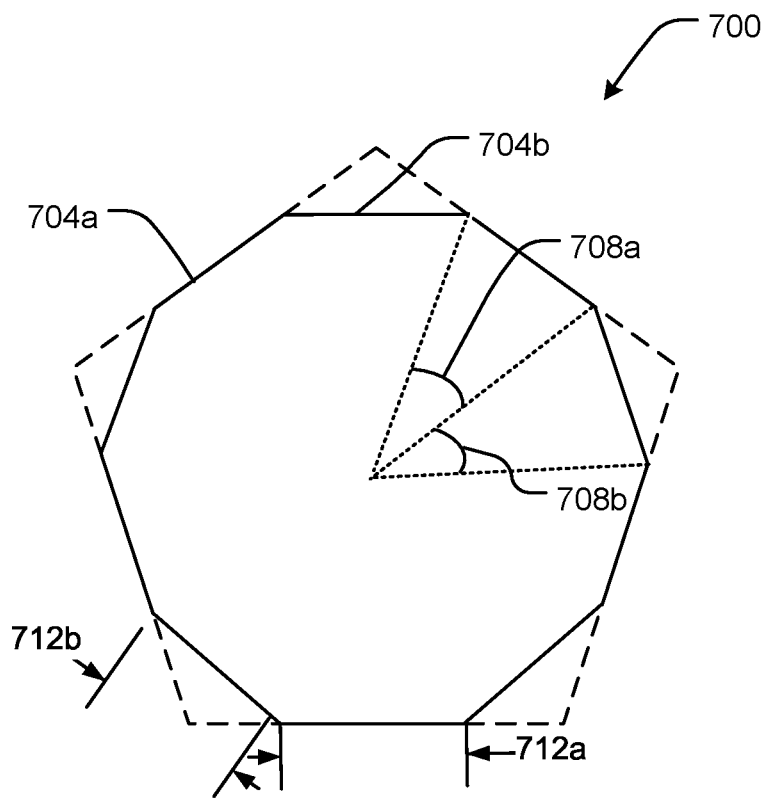
FIG. 7 is a top view of an example of a convex polygon scanner.
Figure 7:
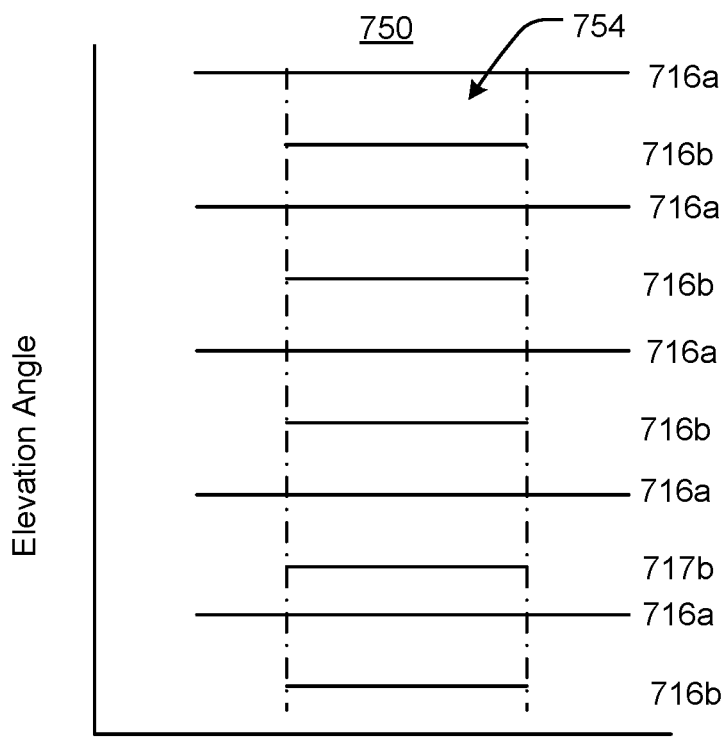

FIG. 7 depicts an example of a polygon scanner 700 and a chart 750 of scan lines (e.g., of transmitted beam 242) achieved using the polygon scanner 700. The polygon scanner 700 can incorporate features of the polygon scanners 232, 300, 400, 500, 600, and be used to implement the polygon scanner 232. The polygon scanner 700 can be convex. The polygon scanner 700 includes facets 704 including first facets 704a (e.g., five first facets 504a) and second facets 704b (e.g., five second facets 704b). The polygon scanner 700 can be analogous to a pentagonal polygon scanner (see dashed outline) in which corners are not present, resulting in the second facets 704b.

The first facet 704a defines a first angle 708a, a first length 712a, and a first field of view 716a, and the second facet 704b defines a second angle 708b less than the first angle 708a, a second length 712b less than the first length 712a, and a second field of view 716b less than the first field of view 716a. For example, the first angle 708a can be 48 degrees, the first field of view 716a can be 96 degrees, the second angle 708b can be 24 degrees, and the second field of view 716b can be 48 degrees, providing a 48 degree overlap portion 754.

Figure 8:
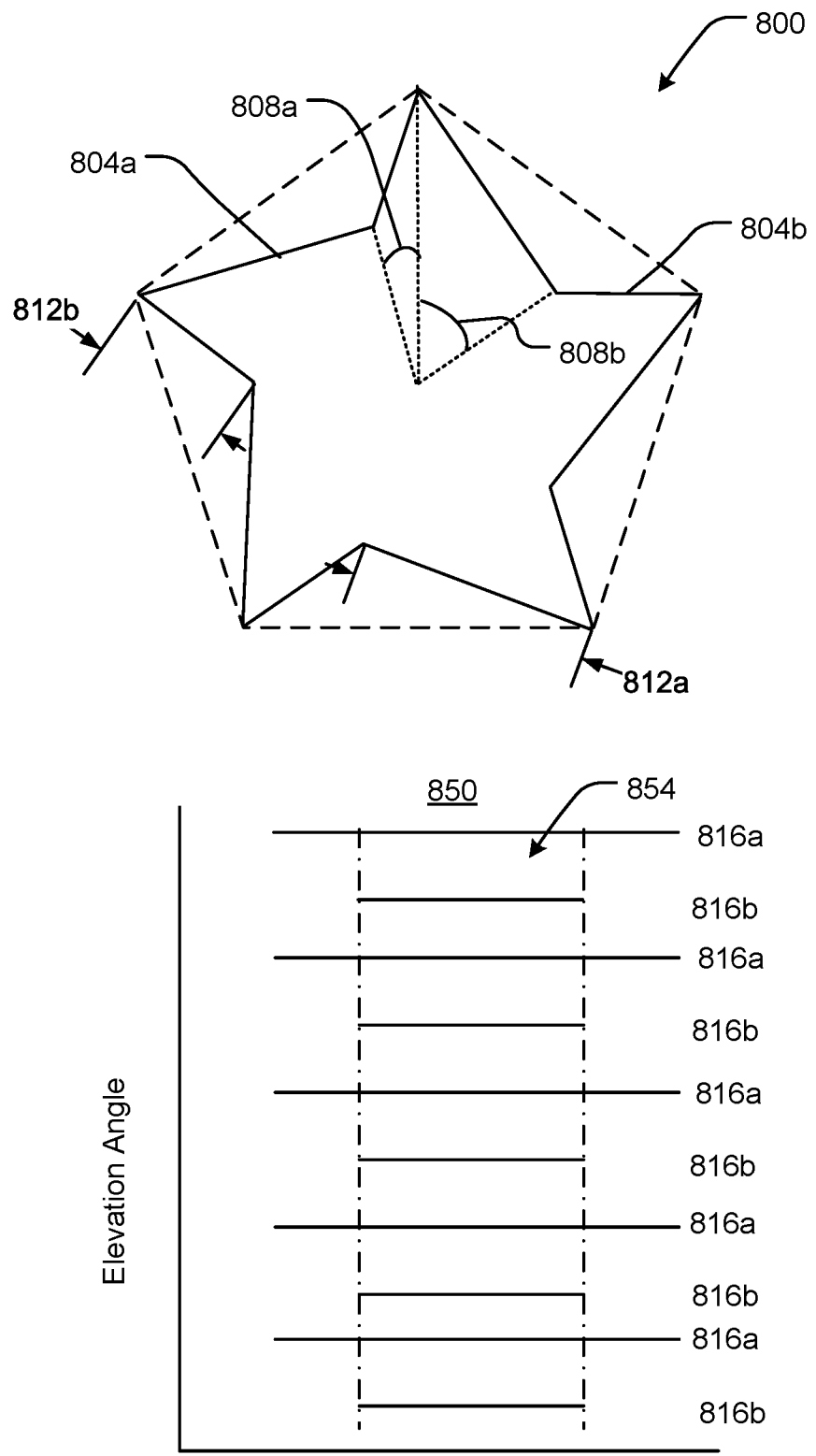
FIG. 8 is a top view of an example of a concave polygon scanner.

FIG. 8 depicts an example of a polygon scanner 800 and a chart 850 of scan lines (e.g., of transmitted beam 242) achieved using the polygon scanner 800. The polygon scanner 800 can be similar to the polygon scanner 700 (e.g., analogous to a pentagonal polygon scanner) and can have a concave form factor. The polygon scanner 800 can include facets 804 including first facets 804a (e.g., five first facets 804a) defining a first length 808a, a first angle 812a, and a first field of view 816a, and second facets 804b (e.g., five second facets 804b) defining a second length 808b less than the first length 808a, a second angle 812b less than the first angle 812a, and a second field of view 816b less than the first field of view 816a. For example, the first angles 812a can be 48 degrees, the second angles 812a can be 24 degrees, the first fields of view 816a can be 96 degrees, and the second fields of view 816b can be 48 degrees, providing a 48 degree overlap portion 654.

Figure 9:
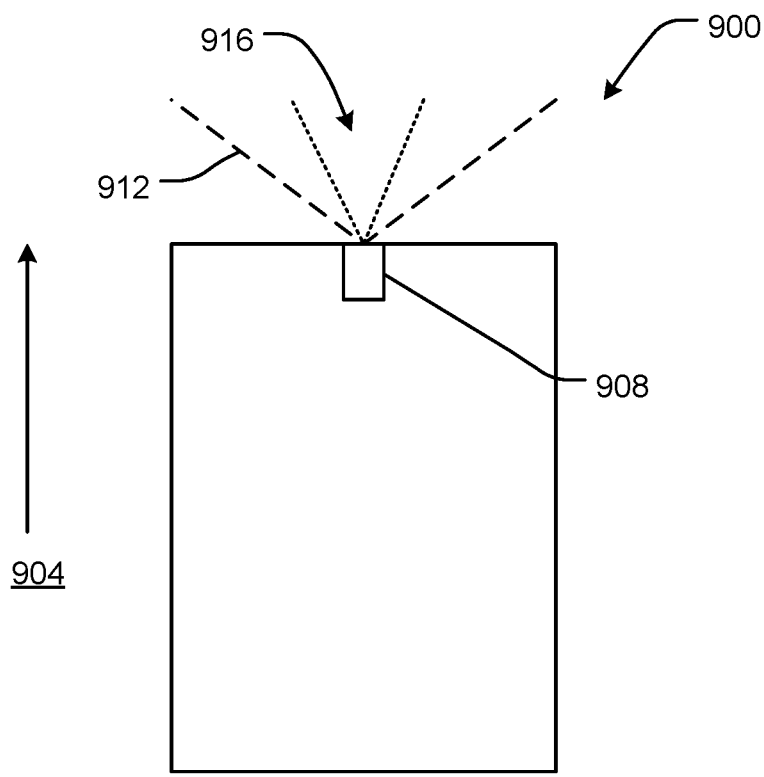
FIG. 9 is a top view of examples of vehicles implementing LIDAR system that use polygon scanners.
Figure 9:
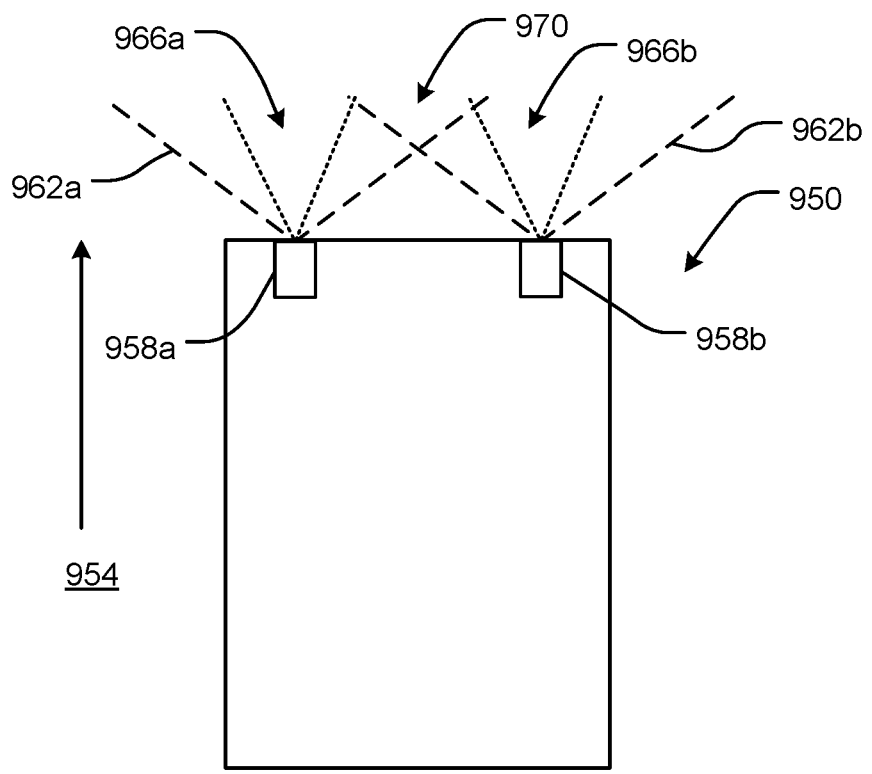

FIG. 9 depicts an example of a vehicle 900 (e.g., autonomous vehicle 100) that moves in a forward direction 904 and includes a polygon scanner 908, and a vehicle 950 (e.g., autonomous vehicle 100) that moves in a forward direction 954 and includes two polygon scanners 958a, 958b (collectively, polygon scanners 958). The polygon scanners 908, 958 can be implemented as part of LIDAR system 200, and using various polygon scanners described herein, such as the polygon scanners 300, 400, 500, 600, 700, 800. The vehicles 900, 950 can be autonomous vehicles (e.g., an autonomous vehicle that may operate either completely or partially in an autonomous manner (i.e., without human interaction)), including an autonomous truck.

The vehicle 900 can include the polygon scanner 908 in a central position, so that a field of view 912 of the polygon scanner 908 extends forward to sweep azimuthal angles relative to the vehicle 900. The polygon scanner 908 can be mounted to and oriented relative to the vehicle 900 so that the field of view 912 can have an overlap region 916 of relatively high resolution or sampling density that is at least partially in front of the vehicle 900. The polygon scanner 908 can be positioned in various positions on the vehicle 900, such as to orient the overlap region 916 to detect information regarding objects that may be in the vicinity of more complex maneuvers to be performed by the vehicle 900, such as to position the polygon scanner 908 on a left side of the vehicle 900 for sampling information for performing left-hand turns.

The vehicle 950 can include a first polygon scanner 958a on a left side of the vehicle 950, and a second polygon scanner 958b on a right side of the vehicle 950. The first polygon scanner 958a can have a first field of view 962a that includes an overlap region 966a, and the second polygon scanner 958b can have a second field of view 962b that includes an overlap region 966b, each of which are depicted to extend forward of the vehicle 950. The polygon scanners 958 can be positioned so that an overlap region 970 forms between the fields of view 962a, 962b, which may further facilitate increasing the sampling density directly in front of the vehicle 950, or may be positioned further apart so that the fields of view 962a, 962b do not overlap (e.g., to increase sampling from lateral regions relative to the direction 954).

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A light detection and ranging (LIDAR) system, comprising:
   a laser source configured to output a first beam; and
   a scanner shaped as an irregular polygon, the scanner configured to reflect the first beam to output a second beam as a scan having a greater sampling density in a first portion of a field of view of the scanner than a second portion of the field of view.

2. The LIDAR system of claim 1, wherein the scanner comprises a plurality of facets, wherein a first facet of the plurality of facets has a first length and a second facet of the plurality of facets has a second length that is different than the first length.

3. The LIDAR system of claim 1, wherein the scanner comprises a plurality of facets, and a number of the plurality of facets is greater than or equal to six and less than or equal to twelve.

4. The LIDAR system of claim 1, wherein the scanner comprises a plurality of facets, and wherein a first angle defined from a center of the scanner to a first facet of the plurality of facets is greater than a second angle defined from the center to a second facet of the plurality of facets.

5. The LIDAR system of claim 1, wherein the scanner has a diameter that is greater than or equal to 50 millimeters (mm) and less than or equal to 250 mm.

6. The LIDAR system of claim 1, wherein the scanner is reflective.

7. The LIDAR system of claim 1, wherein the scanner is made of at least one of a metal material or a polymeric material.

8. The LIDAR system of claim 1, further comprising at least one of a splitter, a modulator, or a circulator to receive the first beam from the laser source and provide the first beam to the scanner.

9. The LIDAR system of claim 1, further comprising a motor configured to rotate the scanner about an axis of rotation, wherein the scanner comprises a plurality of facets oriented at different angles relative to the axis of rotation.

10. The LIDAR system of claim 1, wherein the scanner is convex.

11. A light detection and ranging (LIDAR) system, comprising:
   a laser source configured to output a first beam; and
   a polygon scanner comprising a plurality of facets having different lengths to output the first beam as a scan having a greater sampling density in a first portion of a field of view of the polygon scanner than a second portion of the field of view.

12. The LIDAR system of claim 11, wherein the scanner has a diameter that is greater than or equal to 50 millimeters (mm) and less than or equal to 250 mm.

13. The LIDAR system of claim 11, wherein the scanner is reflective.

14. The LIDAR system of claim 11, further comprising at least one of a splitter, a modulator, or a circulator to receive the first beam from the laser source and provide the first beam to the scanner.

15. The LIDAR system of claim 11, further comprising one or more processors configured to determine at least one of a range to or a velocity of an object using a return beam from at least one of reflection or scattering of the second beam by the object.

16. The LIDAR system of claim 15, wherein the one or more processors are configured to control operation of at least one of a steering system or a braking system using the at least one of the range or the velocity.

17. An autonomous vehicle, comprising:
   a LIDAR system comprising:
      a laser source configured to output a first beam;
      a scanner shaped as an irregular polygon, the scanner configured to receive the first beam to output a second beam as a scan having a greater sampling density in a first portion of a field of view of the scanner than a second portion of the field of view;
   a steering system;
   a braking system; and
   a vehicle controller comprising one or more processors configured to:
      determine at least one of a range to or a velocity of an object using a return beam from at least one of reflection or scattering of the second beam by the object; and
      control operation of the at least one of the steering system or the braking system responsive to the at least one of the range or the velocity.

18. The autonomous vehicle of claim 17, wherein:
   the scanner comprises a first facet having a first facet field of view and a second facet adjacent to the first facet and having a second facet field of view; and
   the scanner is mounted to the autonomous vehicle so that an overlap of the first facet field of view and the second facet field of view is at least partially in front of the autonomous vehicle, wherein the first portion of the field of view of the scanner corresponds to the overlap.

19. The autonomous vehicle of claim 17, wherein the scanner is a first scanner comprising a first facet having a first facet field of view and a second facet adjacent to the first facet and having a second facet field of view, the autonomous vehicle further comprising a second scanner comprising a third facet having a third facet field of view and a fourth facet having a fourth facet field of view, wherein the fourth facet field of view overlaps the third facet field of view and is smaller than the third facet field of view.

20. The autonomous vehicle of claim 17, wherein the scanner is configured to be rotated to scan the second beam over azimuthal angles with respect to the autonomous vehicle.

* * * * *